E. R. PERSON.
DRAG RETURN FOR CUTTING MACHINES.
APPLICATION FILED JUNE 19, 1918.
1,290,336.
Patented Jan. 7, 1919.
2 SHEETS—SHEET 1.
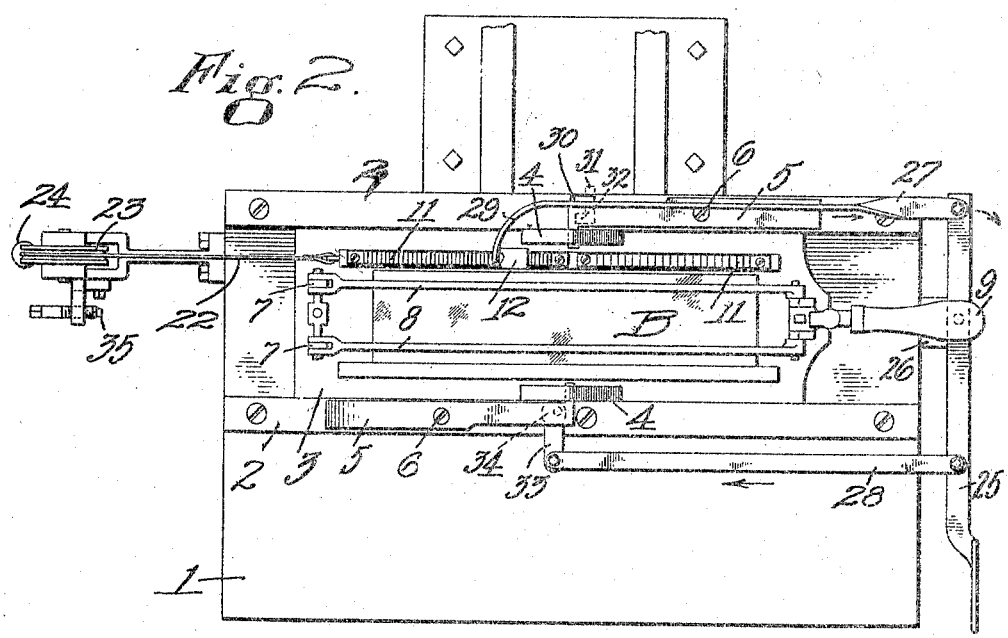
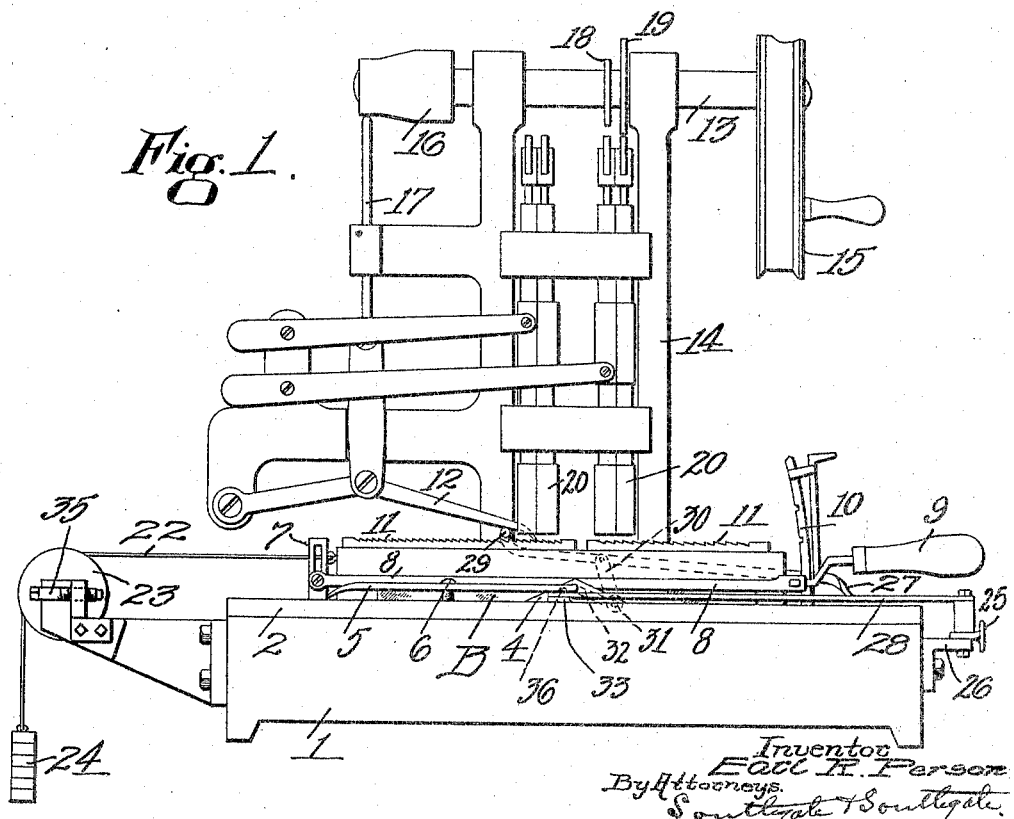
Inventor
Earl R. Person
By Attorneys
Southgate & Southgate

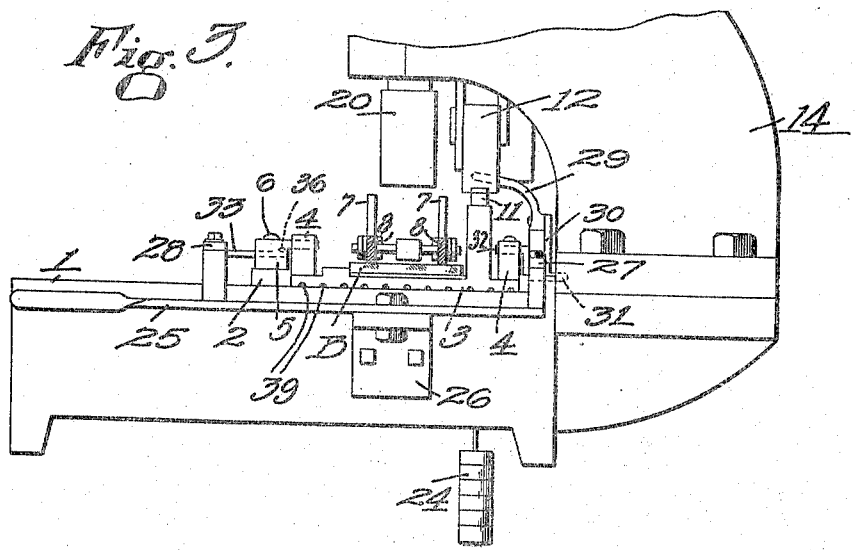

UNITED STATES PATENT OFFICE.

EARL R. PERSON, OF LEOMINSTER, MASSACHUSETTS, ASSIGNOR TO THE VISCOLOID COMPANY, OF LEOMINSTER, MASSACHUSETTS, A CORPORATION OF MASSACHUSETTS.

DRAG-RETURN FOR CUTTING-MACHINES.

1,290,336. Specification of Letters Patent. Patented Jan. 7, 1919.

Application filed June 19, 1918. Serial No. 240,759.

*To all whom it may concern:*

Be it known that I, EARL R. PERSON, a citizen of the United States, residing at Leominster, in the county of Worcester and State of Massachusetts, have invented a new and useful Drag-Return for Cutting-Machines, of which the following is a specification.

This invention relates to a device for simultaneously releasing the drag of a cutting machine and returning it to original position after the cutting operation. It is especially designed for use on machines for cutting sheet celluloid as for example in the manufacture of combs.

The principal object of the invention is to provide a simple and convenient arrangement by which the operator by a single motion can release both sides of the drag in such a way that the drag can return to its original position after it has been through the machine and coöperating mechanism for lifting the operating dog or other means for feeding the drag forward and rendering it inoperative so that the drag can move back. The invention also involves improvements in details of construction and combinations of parts.

Reference is to be had to the accompanying drawings, in which—

Figure 1 is a front elevation of an ordinary comb-cutting machine showing a preferred embodiment of this invention applied thereto;

Fig. 2 is a plan of the table thereof, the cutting mechanism itself not being shown;

Fig. 3 is an elevation of one end, and

Fig. 4 is an elevation of the other end.

I have shown the invention as applied to a well-known type of comb-cutting machine which involves a table 1 for supporting the work, this table being provided with two guides 2 arranged longitudinally thereon and between which operates the drag 3. This drag is designed for supporting the blanks B of celluloid which are to be cut up. Each side of the drag is provided with a flat surface on which rests a shoe 4 for holding the drag down on the table. Each shoe is held down by a spring 5 fastened in a stationary position by a stud 6 on the guide and having an angular end which enters an opening in the shoe. Thus it presses the shoe down on the edge of the drag with spring pressure.

On the rear of the drag are brackets 7 to which are pivoted a pair of arms 8 having a handle 9. These arms constitute means for holding the blank down on the drag. They are raised to release the blank. This handle is held down normally by a positive means (not shown). A guide 10 is shown for the handle.

On the drag is a raised rack 11 which is designed to be operated by a ratchet dog 12. This dog is operated from a main shaft 13 which is supported on the cutter frame 14. This shaft is operated by a hand wheel 15 or by a belt, as desired. It is provided with a cam 16 which operates a slide 17 and this operates the dog 12. At each rotation of the shaft 13 the dog goes back and forth, and pushes the drag forward a certain distance, so that the forward motion of the drag is intermittent.

The shaft 13 is provided with cams 18 and 19 which operate a cutter 20, details of which are not illustrated herein. It will be obvious that the cutter comes down when the drag is stationary and cuts out the teeth, and then rises and strips them. Then the drag feeds forward by means of the dog 12 and stops, and then the operation is repeated. I have shown a double-cutter style of machine, although the invention is independent of that feature. The above machine as described is an old one and well understood in this art, and I have described it only in a general way in order to show how this invention is applied to it.

For the purpose of drawing the drag back I have attached to it a rope, chain or cable 22 which passes over a pulley 23 and has a weight 24 which always tends to draw it back, and will do so whenever the dog 12 is raised. For the purpose of raising this dog I have shown a lever 25 pivoted on a projection or bracket 26 on the table and connected with the opposite ends of the lever are two links 27 and 28. The link 27 has a transverse end 29 normally located under the dog 12 in such a position as not to affect its normal operation. But when the lever is moved in the direction of the arrow in Fig. 2, the rear end moves back to the right and the rod 29 follows it and engages under the dog 12, lifting it from the rack. This will allow the weight 24 to pull the drag back as far as the rack is concerned, but it is to be remembered that the shoes 4 are still pressing down on the drag with spring pressure due to the springs 5.

To overcome this the arm 27 is pivotally connected with an arm 30 extending up from an oscillating shaft 31 below. This shaft has a cam 32 on it which is so located as to engage under the end of the spring 5 on that side and lift it, thus releasing the shoe from spring pressure and allowing the drag to be drawn back by the weight. The same action is performed on the other side by the link 28 swinging an arm 33 extending out from a pivoted member 34 which has a cam surface also engaging under the spring 5 on that side, and lifting it when this link 28 is moved to the left. The cam in this case is simply an eccentric projection 36 fitting a depression in the bottom of the spring. The turning of the arm 33 moves the projection out of the depression so the spring is lifted.

In this way it will be seen that by the simple operation of the lever 25 the two shoes on the two sides of the drag are relieved from spring pressure so that it is free to move in either direction, and also the dog 12 is raised so that the weight is free to draw the drag back until it engages the usual stop 35. It will be understood of course that the weight does not draw the drag back during the normal operation of the machine because the shoes 4 prevent it.

Another difficulty with the old machine is the fact that the surface on which the drag slides cannot be oiled for certain practical reasons. Therefore the drag hugs down on it and it requires considerable strength to push it back even with the weight on it and the spring pressure removed. I overcome this by the vent grooves 39. They let the air in and therefore the surfaces can be oiled and the drag can be moved easily.

When the drag is drawn back the blanks can be taken out or shifted in the usual way, and the machine is then ready to start again after the lever 25 is shifted back to its normal position. In this way considerable time is saved in the operation of this type of machine and a less skilled operator can be employed than heretofore or even one with less strength.

I have shown two sets of cutting devices 20 and fine and coarse racks 11 for making combs with fine and coarse teeth but the invention is not confined thereto.

Although I have illustrated and described only a single form of the invention and shown it as applied to a single type of cutting machine, I am aware of the fact that modifications in details of construction can be made therein either for the purpose of applying it to other types of machines or for other purposes without departing from the scope of the invention as expressed in the claims. Therefore I do not wish to be limited to all the details of construction or to the particular type of cutting machine herein shown and described, but what I do claim is:—

1. The combination with a machine for cutting combs and the like from sheet celluloid, the movable drag thereof for holding the blanks to be cut, and means for feeding the drag forward intermittently, comprising a rack on the drag and a ratchet dog on the rear of the machine operated by power, of means constantly acting on the drag to hold or draw it back, and independently operable means comprising an operating member located at the front of the machine for removing the dog from engagement with the rack and thus disconnecting the feeding means to permit said drawing means to return the drag to initial position.

2. In a cutting machine of the class described, the combination with a table, a drag movably supported thereon, and means for intermittently moving the drag forward, of means for constantly urging the drag back to return it to its initial position, means for disconnecting the feeding means from the drag to permit it to be drawn back, yielding means for holding the drag in any position to which it is fed by the feeding means, and independently operable means for releasing said yielding means.

3. In a cutting machine of the class described, the combination with a table and a drag thereon adapted to support the work, of means for intermittently feeding the drag forward, yielding means for holding the drag in any position to which it is fed, and manually operated means for releasing said yielding means to permit the drag to be moved back.

4. In a comb cutting machine of the class described, the combination with a table, a drag movable thereon adapted to support the work, and means for intermittently feeding the drag forward, of yielding means for holding the drag in any position to which it it fed, a cam adapted to turn on an axis for moving the yielding means to relieve its pressure, a lever, and means connected with the lever for turning said cam to permit the drag to be moved back.

5. In a comb cutting machine of the class described, the combination with a table, a drag supported thereon, and means for intermittently moving the drag forward, of means for constantly urging the drag back to return it to its initial position, means for disconnecting the feeding means from the drag to permit it to be drawn back, yielding means for holding the drag in any position to which it is fed by the feeding means, a lever, a link connected with the lever, means connected with the link for displacing part of said feeding means when the link is moved by the lever, and means connected with the link for simultaneously releasing the pressure on the drag.

6. The combination with a cutting machine, its movable drag for holding the blanks to be cut, and means for feeding the drag forward intermittently, of means constantly acting on the drag to hold or draw it back, a lever, a link connected with said lever to be operated thereby, and means connected with the link for engaging said feeding means and removing it from operative position to permit the returning means to act to return the drag to initial position.

7. In a cutting machine of the class described, the combination with a table, a drag supported thereon, and means for intermittently moving the drag forward, of means for constantly urging the drag back to return it to its initial position, two yielding means for holding the drag in any position to which it is fed by the feeding means, a lever pivoted at a point between its ends, two links connected with the lever one at each side of its pivot whereby as the lever moves about its pivot one link will move in one direction and the other link in the other direction, two cams connected with said links and adapted to be operated thereby, each of said cams engaging under one of the yielding means and adapted to release said yielding means when turned, and means connected with one of said links for releasing the feeding means.

8. The combination with a cutting machine, its movable drag for holding the blanks to be cut, and power operated means for feeding the drag forward intermittently, of means constantly acting on the drag to hold or draw it back, a hand operated lever pivoted at the end of the machine, a longitudinal link connected with said lever to be operated thereby, and oscillatable means connected with the link for engaging said feeding means and removing it from operative position to permit the returning means to act to return the drag to initial position.

9. In a comb cutting machine of the class described, the combination with a table, a drag supported thereon, and means for intermittently moving the drag forward, of means for constantly urging the drag back to return it to its initial position, means for disconnecting the feeding means from the drag to permit it to be drawn back, yielding means for holding the drag in any position to which it is fed by the feeding means, a lever, means operated by the lever for displacing part of said feeding means and rendering it inoperative, and means connected with the lever for simultaneously releasing the pressure on the drag.

In testimony whereof I have hereunto affixed my signature.

EARL R. PERSON.

Copies of this patent may be obtained for five cents each, by addressing the "Commissioner of Patents, Washington, D. C."